April 19, 1960 L. A. HOHMANN, JR 2,933,563

SIGNAL TRANSLATING CIRCUIT

Filed Nov. 20, 1957 4 Sheets-Sheet 1

INVENTOR
L. A. HOHMANN JR
BY Alan C. Rose
ATTORNEY

April 19, 1960 L. A. HOHMANN, JR 2,933,563

SIGNAL TRANSLATING CIRCUIT

Filed Nov. 20, 1957 4 Sheets-Sheet 2

INVENTOR
L. A. HOHMANN JR
BY Alan C. Rose
ATTORNEY

INVENTOR
L. A. HOHMANN JR
BY Alan C. Rose
ATTORNEY

April 19, 1960 L. A. HOHMANN, JR 2,933,563

SIGNAL TRANSLATING CIRCUIT

Filed Nov. 20, 1957 4 Sheets-Sheet 4

INVENTOR
L. A. HOHMANN JR
BY Alan C. Rose
ATTORNEY

United States Patent Office 2,933,563

Patented Apr. 19, 1960

2,933,563

SIGNAL TRANSLATING CIRCUIT

Lawrence A. Hohmann, Jr., Chatham, N.J., assignor to Bell Telephone Laboratories, Incorporated, New York, N.Y., a corporation of New York Application November 20, 1957, Serial No. 697,613

24 Claims. (Cl. 179—18)

This invention relates to information translating devices and more particularly to a device for translating information from the form of alternating current signals to direct current signals.

At the present time existing automatic telephone systems in this country employ dial pulse signaling almost exclusively; that is, control of the sytem is effected by the generation of a series of direct current pulses corresponding to the digits comprising the number being called. In attempts to improve upon the present dialing method, it has been proposed to use a push button type of telephone in which the generated signal comprises a plurality of alternating current signals arranged on a multifrequency basis. In such a system these signals are arranged on a multifrequency basis so that various pairs of signals correspond to the various digits. One of the simplest of such schemes employs a two-out-of-five code, there being ten distinct pairs possible from combinations of five different signal frequencies.

While push button telephones utilizing multifrequency signaling techniques will generally be used with central office telephone systems which are designed to respond to such signals, it may be desirable to combine such a telephone instrument with a dial pulse telephone system. In particular, the situation has arisen where a repertory dialing telephone device has been developed to permit the storage of selected telephone numbers and the calling of these numbers upon the operation of a single selector switch. Such a sytem would of necessity be operated with existing pulse responsive telephone central office systems at the present time. However, the storage of the preselected telephone number codes and the output of such a device would advantageously be in the form of multifrequency alternating current signals. To make such a device compatible with existing telephone systems there is required a device for translating the coded information from its multifrequency alternating current form to the proper series of dial pulses acceptable to existing central office equipment.

Accordingly it is a general object of this invention to permit the use of a multifrequency signaling telephone apparatus with a dial pulse central office.

A more specific object of this invention is to permit the use of a remote repertory storage telephone unit in a dial pulse central office area.

It is a further object of this invention to provide a circuit for translating multifrequency alternating current signals to corresponding series of dial pulses.

To accomplish these and other objects it is essential not only to translate the dialed information from the form of multifrequency signals to a direct current pulse form but to hold the input signals for a time—slow them down, so to speak—until the translated information can be sent on at the standard dial pulse rate of ten pulses per second. This is effected in one specific embodiment of my invention by providing a magnetic core storage matrix and a magnetic core translating shift register in combination with suitable filtering and signal amplifying circuitry.

Input multifrequency signals are separated by means of a filter and thereafter amplified before being stored in the storage matrix on a coincident current basis. Representations of multifrequency signals corresponding to successive digits are stored in successive positions in the storage matrix, providing the preceding digits have not already been transferred from this matrix. During intervals between multifrequency signals the digits stored in the storage matrix are automatically transferred to the translating shift register and temporarily stored therein. By arrangement of the windings on the magnetic cores in the translating shift register, the position of storage depends upon the value of the decimal digit being stored. Immediately after storage of a digit in the translating shift register the position of storage of this information is transferred through the register in steps, each step causing the operation of a pulse generator and the generation of a single dial pulse at the output of the device. Passage of the stored digit through the last sections of the translating shift register results in a timed absence of dial pulses to provide a proper interdigital interval to signify the termination of the digit pulse series.

In accordance with a feature of the invention, a source of high speed multifrequency signals is coupled to apply digital indications to a storage matrix, a stepping circuit is advanced by a number of states corresponding in successive cycles to successive digital indications derived from the storage matrix, and pulse output circuitry is energized by transitions in the state of the stepping circuit to produce a series of groups of output pulses in successive cycles corresponding to the digital indications represented by the original multifrequency signals.

Another feature of this invention is the provision of a pair of magnetic storage devices to provide accommodation of the functions of information storage for a given time and translation of the information from one form to another.

An additional feature of this invention is the use of a magnetic storage device in such an arrangement to control a pulse generating circuit such that the position of initial storage of information in the device determines the number of pulses to be generated.

A further feature of this invention is the inclusion in an information-translating device of a circuit which is either bistable or monostable depending upon the condition of an associated control circuit.

A complete understanding of this invention and of these and various other features thereof may be gained from consideration of the following detailed description and the accompanying drawing, in which.

Figure 3:
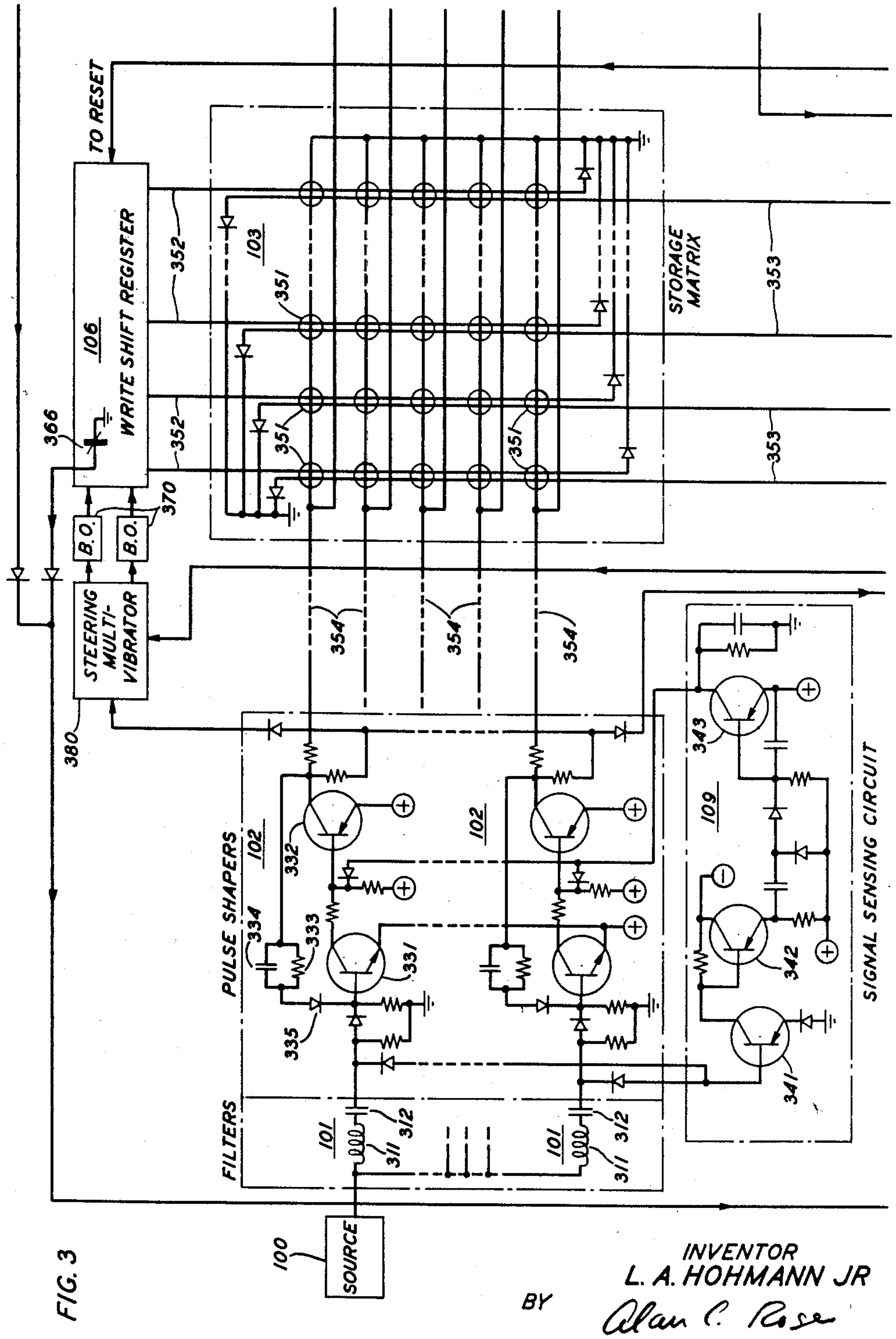
Figure 4:
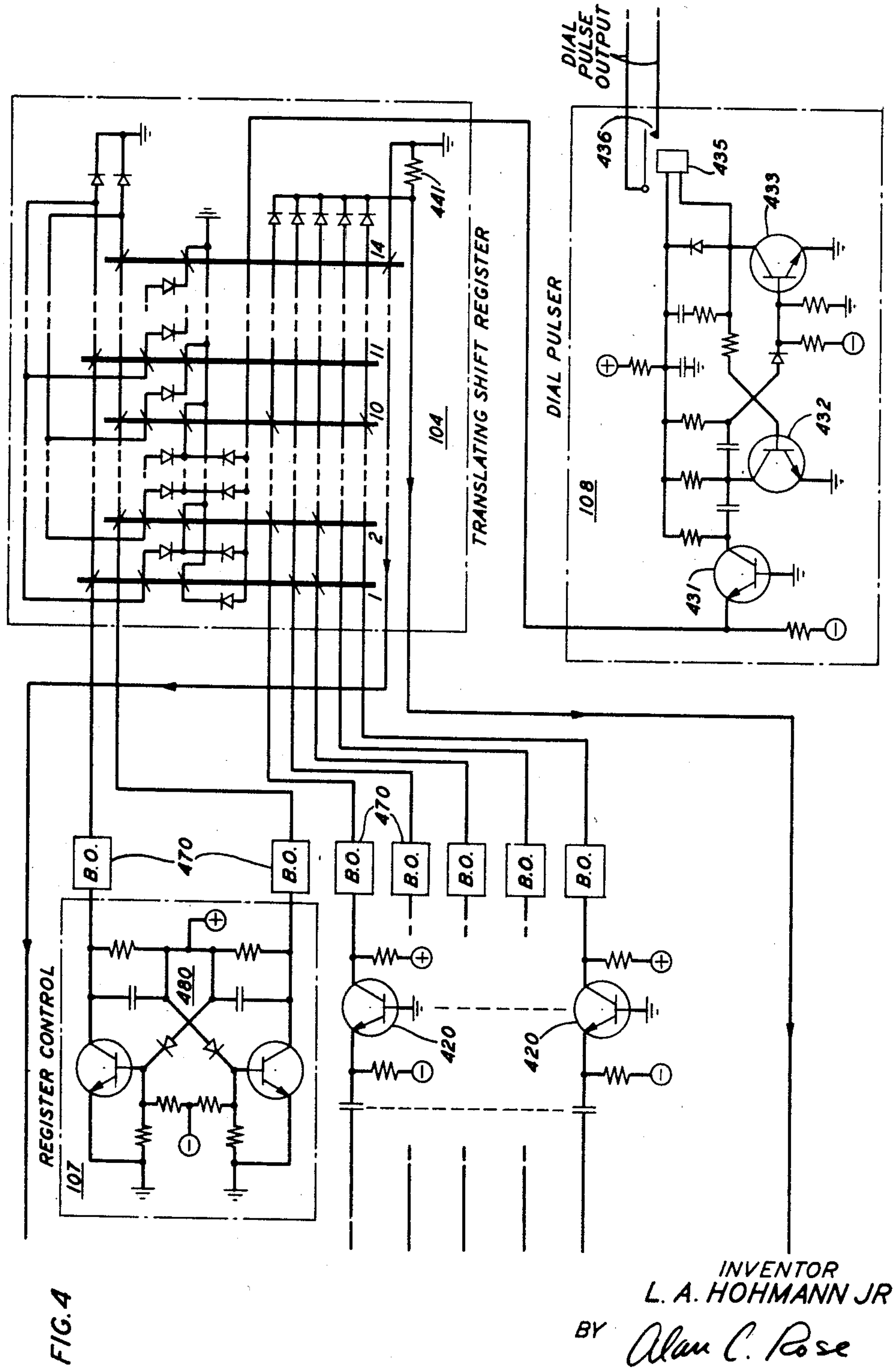
Figure 5:
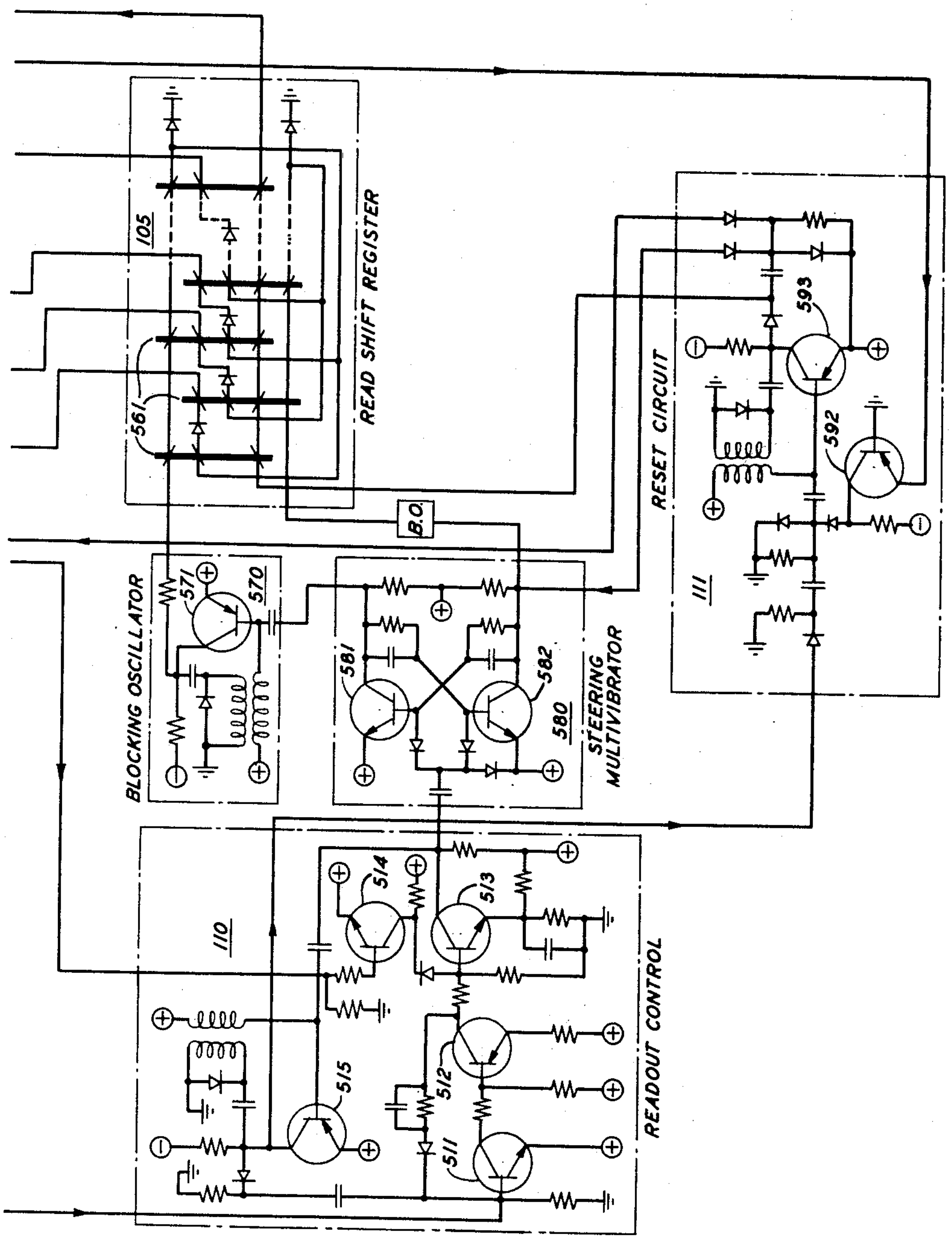

Figs. 3, 4 and 5 together depict a more detailed schematic diagram of one specific embodiment of my invention.

Figures 1, 2:
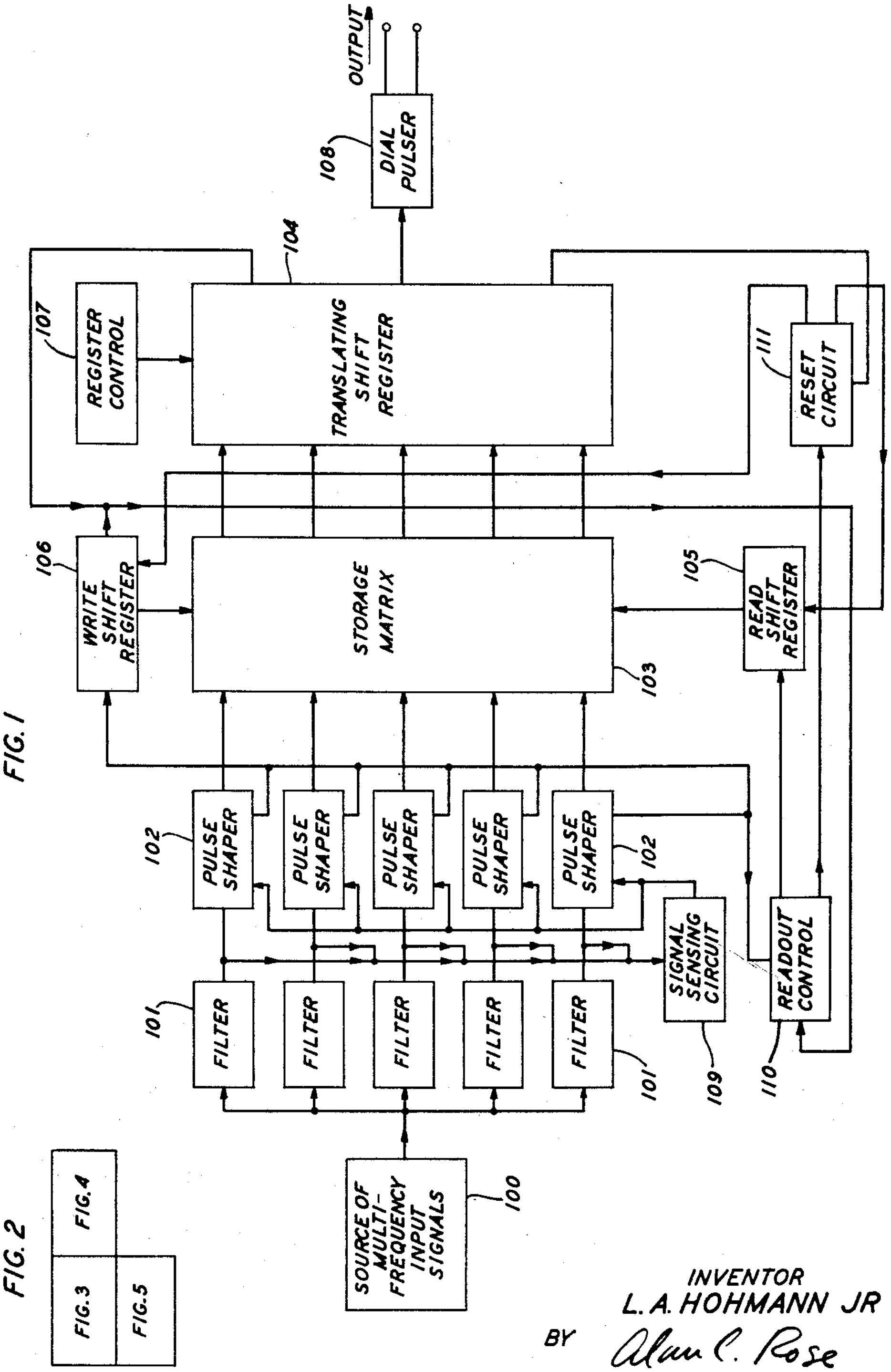
Fig. 1 is a simplified block diagram of one specific embodiment of my invention.
Fig. 2 is a diagram showing the relationship of Figs. 3, 4 and 5.

In Fig. 1, depicting a simplified block diagram of one specific embodiment of the invention, there is shown a source 100 of multifrequency signals connected to filters 101 arranged in parallel. Following each filter is a pulse shaper 102. The information from source 100 consists of a pair of alternating current signals of different frequencies selected on a two-out-of-five basis. Thus for each of the ten digits a distinct pair of the five available alternating current frequencies is provided by the source 100. The filters 101 are each responsive to one of the available signaling frequencies so that a particular filter passes one frequency and rejects the other four. Thus, for any particular pair of alternating current signals produced by source 100, two of the filters 101 pass the input signal while the other three remain unaffected. As a result the pair of pulse shapers 102 to which the input signal has been passed by filters 101 cause outputs to be applied to the "write" shift register 106, to the readout control circuit 110 and to two of the rows of the storage matrix 103. A resulting signal from the "write" shift register 106 coincidentally with the drive to the selected rows in the storage matrix 103 effects the storage of the particular digit represented by the multifrequency signals from source 100 in storage matrix 103. At the termination of the signals from source 100, readout control circuit 110 is permitted to pass a signal previously received from the "write" shift register 106 to the "read" shift register 105 and the reset circuit 111. Upon receipt of this signal, the "read" shift register 105 causes the information stored in the storage matrix 103 to be passed to the translating shift register 104, where it is converted from a parallel representation form to a series of dial pulses by means of the register control 107 and the dial pulser 108. The series of dial pulses produced at the output of dial pulser 108 represents, in a form suitable for presentation to a dial pulse central office, the digit represented by the multifrequency signal originally produced by source 100. Reset circuit 111 incorporates a delay which causes it to reset the "read" and "write" shift register circuitry after those circuits have performed all their operations.

Figs. 3, 4 and 5 depict in more detailed schematic form the specific embodiment of my invention shown in Fig. 1. In Fig. 3, multifrequency signal source 100 is shown connected to filters 101, each comprising inductance 311 and capacitor 312. These filters, with their associated pulse shapers, 102, represent the first and last of the five input circuits utilized in this specific embodiment of my invention, the remaining circuitry having been omitted for the sake of simplicity. The output of each filter is connected through a suitable isolating diode to the input terminal of the signal sensing circuit 109 comprising transistors 341, 342 and 343 in a known configuration. Signal sensing circuit 109 has an output which removes a positive disabling voltage from the pulse shapers 102 so that those with inputs may conduct.

Pulse shapers 102 each comprise a pair of transistors 331 and 332 arranged with a feedback loop including resistor 333, capacitor 334 and diode 335 in a known configuration to constitute a bistable circuit. One output of pulse shaper 102 is applied to a line 354 which threads a row of magnetic cores 351 in storage matrix 103. Columns of these same cores 351 are threaded by other lines 352 from "write" shift register 106 and by lines 353 from "read" shift register 105.

The amplitude of the drive signals applied to cores 351 along lines 354 and 352, together with the turns of the windings on these cores 351 associated with lines 354 and 352, is such that switching of the cores is accomplished on a coincident current basis. That is, only those cores located at the intersection of particular driving lines 354 and 352 will be switched, thereby accomplishing the storage of the particular digit represented by the signals from source 100. However, the amplitude of signals along lines 353 from the "read" shift register 105 and the turns of the associated windings on cores 351 connected to lines 353 are such that the previously selected cores 351 may be returned to their original condition by a pulse from the "read" shift register 105 alone. When a previously switched core 351 is returned to its original condition by a drive pulse from "read" shift register 105, an output pulse appears at its associated input line 354 opposite in polarity to that originally applied thereon. This pulse is applied to the associated transistor 420 and thence to a blocking oscillator 470, similar to that shown in schematic form in Fig. 5 and there designated 570. Blocking oscillator 470 thereupon regenerates the pulse and applies it to an associated horizontal row in translating shift register 104.

The cores of translating shift register 104 are operated on a coincident current basis, as is known in the art, and only that core which has windings connected to the particular pair of blocking oscillators 470 operated by outputs from storage matrix 103 is switched. The cores 1 to 10 of translating shift register 104 serve to store the information received from storage matrix 103. The particular core which is switched represents a particular digit by the position of the core in translating shift register 104. This will become apparent in a later description of the operation of this portion of the circuit. Cores 11 through 14 of translating shift register 104 store no digital information but provide the necessary regulated interdigital intervals in the train of dial pulses representing a series of digits.

The schematic representation of the magnetic cores depicted in registers 104 of Fig. 4 and 105 of Fig. 5 employs a form familiar to those skilled in the art. This "mirror symbol representation," as it has been designated, is fully described, for example, in "Pulse-Switching Circuits Using Magnetic Cores," Proceedings of the I.R.E., May 1955, page 570 ff. at page 572.

Register control circuit 107, comprising free running multivibrator 480 and a pair of blocking oscillators 470 in known circuit configurations, furnishes drive to translating shift register 104 to cause the stepping of the stored digital information out of the translating shift register 104. The resultant output is applied to dial pulser 108, comprising transistor 431 functioning as a buffer amplifier and transistors 432 and 433 connected in a known monostable circuit. Relay 435 is operated by the switching of this monostable circuit, causing the closure of contacts 436 situated in the central office line to produce dial pulses on this line similar to those produced by the operation of the dial on a standard telephone instrument.

"Read" shift register 105 in Fig. 5 provides the necessary drive signals to transfer the previously stored information out of storage matrix 103. It comprises magnetic cores 561, each core having a plurality of windings thereon, arranged in a configuration known in the art. "Read" shift register 105 is under the control of steering multivibrator 580 which applies a pair of out-of-phase outputs through blocking oscillators to the "read" shift register. Blocking oscillator 570, comprising transistor 571 with associated circuitry in a known configuration, is typical of the blocking oscillators employed in this specific embodiment of my invention.

"Write" shift register 106 in Fig. 3, together with its steering multivibrator 380 and pair of blocking oscillators 370, is arranged in a similar fashion. It has, however, an extra output winding 366 on its initial core to furnish a signal to transistor 511, as will be described below. Steering multivibrator 580 and reset circuit 111 are under the control of readout control circuit 110 comprising transistors 511 and 512 in a bistable circuit similar to that used by pulse shaper 102. This bistable circuit of readout control circuit 110 is combined with control transistors 513 and 514 and a feedback path through transistor 515 in a blocking oscillator configuration to provide either bistable or monostable operation of readout control circuit 110, depending upon the input applied to the base of transistor 514 from pulse shaper circuits 102. Circuit 110 has two outputs, one from transistor 513 which initiates readout through steering circuit 580, and a second which is delayed slightly from the first by blocking oscillator 515. This output is fed to circuit 111. Reset circuit 111 includes an inhibiting gate circuit comprising transistor 592 and transistor 593 in a conventional blocking oscillator circuit. Gating transistor 592, when inhibited by an output of a blocking oscillator 470 (see Fig. 4), applied across resistor 441 in translating shift register 104, blocks the signal received from the readout control circuit 110. This inhibiting action occurs when a digit is simultaneously being stored in register 104. Without the inhibiting action reset circuit 111 applies reset signals to steering multivibrators 580 and 380 and the "read" and "write" shift registers 105 and 106, respectively, after their functions are completed.

In the operation of one specific embodiment of my invention, source 100 produces a series of successive input signals, each consisting of a pair of alternating current frequencies corresponding to a particular decimal digit in a two-out-of-five numerical code. Input filters 101 separate the input multifrequency signals and apply them to the proper pair of pulse shapers 102. Each of these in turn, furnishes one of the coincident current inputs directly to particular cores 351 of storage matrix 103 while signaling steering multivibrator 380 to cause "write" shift register 106 to provide the other such input. In this way storage of the information representing the first digit is stored in the proper pair of cores 351 of the first column of storage matrix 103. With the shifting of the first core in the "write" shift register 106, its special output winding 366 applies a signal to the base of transistor 511 in readout control circuit 110.

In the absence of succeeding signals from source 100, readout control circuit 110, in response to the pulse from winding 366, causes steering multivibrator 580 to change state. Its output pulse causes the "read" shift register 105 to read out the digit previously stored in storage matrix 103. However, where the first input signal is immediately followed by a second multifrequency signal from source 100, a pulse shaper 102 inhibits the readout control circuit 110 by applying a signal through transistor 514 to hold the base of transistor 513 negative and prevent the positive signal delivered from transistor 512 from turning on transistor 513.

In either event, the bistable circuit comprising transistors 511 and 512 turns on in response to the signal received from winding 366 and remains on until the output of the pulse shapers 102 changes as a result of the termination of signals from source 100. Once this output changes to the "no signal" state, transistor 513 is enabled to pass the signal from transistor 512 to the output of readout control circuit 110, thus initiating the action of the steering multivibrator 580 and the "read" shift register 105. This output is also applied back through transistor 515 to inject a negative pulse to the base of transistor 511 and turn off the bistable circuit comprising transistors 511 and 512, thereby preparing the readout control circuit 110 for its next input signal.

In the event that successive input signals are produced by source 100 without the operation of the "read" shift register 105, their storage is effected in succeeding columns of storage matrix 103 by the operation of "write" shift register 106 as is known in the art. Storage matrix 103 is arranged in one specific embodiment of my invention to contain fourteen columns of magnetic cores 351 to provide for the storage of any number up to fourteen digits, a capacity adequate to handle those numbers normally employed in a central office code. Should it be desirable to provide an increased capacity, such is easily accomplished by adding succeeding columns of cores to storage matrix 103 and its associated registers 106 and 105, as will be apparent to those versed in the art.

Readout of the stored information in the storage matrix 103 is accomplished in the order in which the information was first stored. The operation of "read" shift register 105 transfers the information from storage matrix 103 to translating shift register 104 on a serial basis, that is, one digit at a time, and until that digit has been stepped out of the translating shift register 104, no further transfer of information from storage matrix 103 occurs. Pulses produced by the readout of a particular column in storage matrix 103 and amplified by the intervening amplifiers are applied to the respective rows in translating shift register 104. Only one core of register 104 is switched in this transfer and, as explained previously, its position corresponds to the particular digit being stored. Since there are ten storage cores corresponding to the ten possible decimal digits presented on a two-out-of-five selection basis, it can be seen that the translating shift register 104 provides the necessary translation required in changing from a two-out-of-five to a decimal code.

Free running multivibrator 480, with its associated blocking oscillators 470, applies switching pulses to a pair of control leads in shift register 104. Once a core in the register has been switched by the transfer of information from storage matrix 103, these switching pulses step the storage position from core to core through the translating shift register 104. Each time one of the storage cores 1 through 10 is returned to its nonstorage condition its output winding applies a pulse to the input of transistor 431 in dial pulser 108 through an associated diode in a conventional OR circuit. The resultant operation of dial pulser 108 produces a dial pulse on a central office line by means of relay contacts 436. If, for example, the digit stored in translating shift register 104 happened to be seven, its initial position of storage would be in the sixth core preceding storage core 10 or in core 4. Accordingly, seven dial pulses would be produced as the stored digital signal passed through the storage section of translating shift register 104. As previously described, cores 11 through 14 are provided in register 104 following the storage section comprising cores 1 through 10 to provide the proper interdigital period at the end of each dial pulse train. No output is applied from translating shift register 104 to dial pulser 108 during the switching of cores 11 through 14. However, the start signal to initiate the readout of the next succeeding digit from storage matrix 103 is not applied until the return of core 14 to its quiescent state.

Core 14 of translating shift register 104 has on it an extra output winding which is connected through an isolating diode to the input of readout control circuit 110. When reset, core 14 applies its output signal to the base of transistor 511 in readout control circuit 110 to initiate the succeeding readout cycle. Thus, at the end of each series of dial pulses and the following interdigital interval, a start pulse is received from the extra winding on core 14 in translating shift register 104 to initiate the succeeding readout cycle. In the absence of input signals from source 100, as previously described, readout control circuit 110 thereupon initiates the readout of the next succeeding digit from storage matrix 103.

The same signal slightly delayed in readout control circuit 110 initiates the operation of the reset circuit 111, as previously described. However, the delayed pulse in the reset circuit 111 is blocked by the inhibiting action of the transistor 592 whenever a digit is being transferred from storage matrix 103 to translating shift register 104. Only after the last stored digit of matrix 103 has been stepped through register 104 does this inhibiting signal fail to occur. In such a case, the signal from readout control circuit 110 causes reset circuit 111 to generate a pulse which resets the "read" and "write" shift registers 105 and 106 and their associated steering multivibrators 580 and 380, respectively, as was described previously. The translator is thereupon prepared for the application of further signals from source 100.

Portions of the above-described specific embodiment of my invention employ circuitry which is known to those skilled in the art. In addition, the voltages applied at terminals represented by positive or negative signs are such as will provide for the proper operation of the associated circuitry. It is contemplated that other equivalent circuitry may be employed in the practice of my invention without departing from the scope thereof.

It is to be understood that the above-described arrangements are illustrative of the principles of the invention. Numerous other arrangements may be devised by those skilled in the art without departing from the spirit and scope of the invention.

What is claimed is:

1. A signal translating system comprising a source of multifrequency alternating current signals, first and second magnetic storage means, means between said signal source and said first magnetic storage means for identifying said signals, first driving means for causing the storage of information represented by said signals in said first storage means, second driving means for transferring stored information from said first storage means to said second storage means, third driving means connected to said second storage means to produce the readout of said information stored in said second storage means, and pulse generating means connected to said second storage means to generate direct current pulses in accordance with said information stored in said second storage means.

2. A signal translating circuit as set forth in claim 1 in which said first magnetic storage means comprises a plurality of magnetic cores having the property of remanent magnetization, each having a plurality of windings thereon, said cores being arranged to effect the storage of information in said magnetic storage means according to the state of remanent magnetization produced by said first driving means in cooperation with said windings of said cores.

3. A signal translating circuit as set forth in claim 1 in which said second magnetic storage means comprises a plurality of magnetic cores capable of existing in one of two remanent magnetization states and having a configuration such that the information stored in said second magnetic storage means depends upon the position of a selected one of said cores which is switched by said second driving means.

4. A signal translating circuit as set forth in claim 3 in which said pulse generating means further includes relay means to produce a number of direct current pulses related to said position of said selected core.

5. A signal translating system comprising first and second information storage arrays including magnetic elements having essentially rectangular hysteresis loops, a source of multifrequency alternating current signals, filter means between said source and said first information storage array for separating said signals, means connected to said filter means for recording the presence of said signals in selected elements of said first information storage array, means for transferring recorded information from said first storage array to said second storage array, and means connected to said second storage array to provide an output signal identifying the position of stored information in said second storage array.

6. A signal translating system as set forth in claim 5 wherein said means connected to said second storage array includes pulse producing means to produce a series of direct current pulses as said output signal.

7. A system for translating electrical signals from a multifrequency code form to a direct current pulse code form comprising input means, first magnetic storage means connected to said input means, second magnetic storage means connected to said first magnetic storage means, said first and second magnetic storage means including magnetic elements having substantially rectangular hysteresis loops, means cooperating with said input means to effect the storage of information represented by multifrequency signals in said first magnetic storage means, control means to transfer said stored information from said first magnetic storage means to said second magnetic storage means, and output means for producing direct current pulses corresponding to said information stored in said second magnetic storage means.

8. A system for translating electrical signals as set forth in claim 7 wherein said input means includes filter means for separating and identifying the frequencies comprising said multifrequency signals.

9. A system for translating electrical signals as set forth in claim 7 wherein said control means comprises means for effecting the storage of information in a particular position in said second magnetic storage means uniquely related to said original multifrequency signal.

10. A system for translating electrical signals as set forth in claim 9 in which said control means further comprises a readout control circuit having a plurality of terminals, internal and external feedback paths, and gating means between an intermediate and an output terminal, said internal feedback path connecting an input and said intermediate terminals to cause the storage in said circuit of a signal applied to said input terminal, said external feedback path connecting an output terminal with said input terminal to restore the original condition of said circuit upon the passage of said stored signal through said gating means.

11. A signal translating system comprising means for detecting signals of preselected frequencies, first magnetic storage means having magnetic memory elements for storing the information represented by said detected signals, second magnetic storage means for reproducing in order said information stored in particular elements of said first magnetic storage means, means for transferring said stored information from said first to said second magnetic storage means, and pulse generating means for producing trains of direct current output pulses corresponding to the location of stored information within said second magnetic storage means.

12. An electrical circuit comprising first and second magnetic storage arrays having memory elements with essentially rectangular hysteresis loops, a source of multifrequency signals, means for storing information in said first magnetic storage array corresponding to signals from said signal source, means for transferring said stored information from said first magnetic storage array to said second magnetic storage array, and pulse generating means for producing trains of direct current pulses corresponding to the information stored in said second magnetic storage array.

13. An electrical signal translating system comprising input means, first magnetic memory means for storing information represented by alternating current signals applied to said input means, second magnetic memory means for detecting and recording said information stored in said first magnetic memory means, and pulse generating means for producing at said output terminal direct current pulses representing said information recorded in said second magnetic memory means.

14. An electrical signal translating system as set forth in claim 13 wherein said second magnetic memory means comprises hysteretic elements arranged in first and second groups, each of the elements of said first group causing said pulse generating means to produce a pulse for each complete traversal of its hysteresis loop, each of the elements of said second group producing an interval equal to a pulse for each complete traversal of its hysteresis loop.

15. In combination, a source of a series of successive multifrequency alternating current signals, a storage matrix, means including a group of filters for registering representations of the multifrequency signals in said storage matrix, a stepping circuit having a plurality of successive stable states, means for advancing said stepping circuit during successive cycles by a number of states corresponding to the representations in said matrix, and output means responsive to changes of state of said stepping circuit for producing successive groups of pulses corresponding respectively to the successive multifrequency alternating current signals.

16. In combination, a source of a series of successive multifrequency alternating current signals representing a series of decimal digits, a storage matrix, means including a group of filters for registering the series of decimal digits in said storage matrix, a stepping circuit having at least ten successive stable states, means for setting said stepping circuit in successive cycles into states corresponding to the successive decimal digits stored in said storage matrix, means for advancing said stepping circuit to a predetermined state during each cycle, and output means responsive to changes of state of said stepping circuit for producing successive groups of pulses in which each group includes a number of pulses corresponding respectively to each of the successive decimal digits represented by the multifrequency signals.

17. An electrical translator comprising a storage matrix having a plurality of storage elements arranged in rows and columns, first control means for applying parallel input signals to selected elements in successive rows, a translation stepping circuit, second control means for reading out the information stored in successive column elements of said matrix and applying it to a selected position in said stepping circuit in accordance with the particular storage elements from which it is read, an output pulser connected to said stepping circuit, and means for advancing said stepping circuit by a number of positions controlled by the initial selected position in said stepping circuit, said pulser being enabled on the advancing of said stepping circuit to each succeeding position.

18. An electrical translator in accordance with claim 17 further comprising means for inhibiting said reading control means during the application of said input signals to said storage matrix.

19. An electrical translator in accordance with claim 17 further comprising means for resetting said first and second control means, and means for inhibiting said resetting means during the reading of said information out of said storage matrix.

20. An electrical translator in accordance with claim 19 wherein said stepping circuit is a shift register which comprises a plurality of storage devices, each having outputs connected to said pulser, and further comprises storage devices connected to the last of said previously mentioned storage devices, said inhibiting means being unoperated after the stepping of the last of said information along all of said shift register storage devices.

21. An electrical translator comprising a storage matrix including a plurality of magnetic cores having substantially rectangular hysteresis characteristics, said cores being arranged in columns and rows, a writing conductor threading each of said cores in a column, a reading conductor threading each of said cores in a column, and a third conductor threading each of said cores in a row, means for applying parallel input signals to selected ones of said third conductors, a writing shift register for successively applying write pulses to said write conductors, reading means including a reading shift register for successively applying reading pulses to said read conductors, a translating shift register, means connecting said translating shift register to each of said third conductors for storing information in a particular position in said translating shift register in accordance with the particular magnetic cores in a column to which the parallel input signals have been applied, a pulser connected to said translating shift register, and means for causing said information in said particular translating shift register position to be stepped along said translating shift register, said pulser being enabled on the stepping of said information to each succeeding position in said shift register.

22. An electrical translator in accordance with claim 21 further comprising means for preventing input signals applied to said third conductors from being applied directly to said translating shift register and means for preventing said output signals appearing on said third conductors from being applied to said input signal means.

23. An electrical translator in accordance with claim 22 further comprising means for inhibiting said reading means during the application of said input signals to said selected third conductors.

24. An electrical translator in accordance with claim 23 wherein said translating shift register comprises a first plurality of storage devices, each having outputs connected to said pulser, and a second plurality of storage devices wherein said information is stepped first along said first plurality and then along said second plurality of said storage devices, means for resetting said writing and reading shift registers, and means for inhibiting said resetting means during the storing of said information in said translating shift register, said last-mentioned inhibiting means being unoperated after stepping of the last of said information along all of said translating shift register storage devices.

No references cited.